United States Patent
Umehara et al.

(10) Patent No.: US 9,048,888 B2
(45) Date of Patent: Jun. 2, 2015

(54) POWER LINE COMMUNICATION SYSTEM

(75) Inventors: Daisuke Umehara, Kyoto (JP);
Yasuhiro Yabuuchi, Kyoto (JP);
Masahiro Morikura, Kyoto (JP);
Toshiya Hisada, Osaka (JP); Shinichi Ishiko, Yokkaichi (JP); Satoshi Horihata, Yokkaichi (JP); Tetsuo Morita, Osaka (JP)

(73) Assignees: AUTONETWORKS TECHNOLOGIES, LTD., Mie (JP);
SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 56 days.

(21) Appl. No.: 13/877,916
(22) PCT Filed: Oct. 17, 2011
(86) PCT No.: PCT/JP2011/073820
  § 371 (c)(1),
  (2), (4) Date: Apr. 5, 2013
(87) PCT Pub. No.: WO2012/056927
  PCT Pub. Date: May 3, 2012

(65) Prior Publication Data
  US 2013/0195208 A1    Aug. 1, 2013

(30) Foreign Application Priority Data

Oct. 27, 2010  (JP) ................................. 2010-241328
  Oct. 3, 2011   (JP) ................................. 2011-219520

(51) Int. Cl.
  *H04B 3/00*     (2006.01)
  *H04B 3/04*     (2006.01)
  (Continued)

(52) U.S. Cl.
  CPC .................. *H04B 3/04* (2013.01); *H04B 3/542* (2013.01); *H04B 2203/5412* (2013.01); *H04B 2203/5445* (2013.01); *H04B 2203/5458* (2013.01); *H04B 2203/547* (2013.01); *H04L 27/2032* (2013.01)

(58) Field of Classification Search
  None
  See application file for complete search history.

(56) References Cited

U.S. PATENT DOCUMENTS 4,379,284 A * 4/1983 Boykin ........................ 375/329
2004/0258168 A1 12/2004 Propp et al.
(Continued)

FOREIGN PATENT DOCUMENTS

JP      A-2005-531163      10/2005
JP      A-2006-67421       3/2006
(Continued)

OTHER PUBLICATIONS

Yabuuchi et al., "Measurement and Analysis of Impulsive Noise on In-Vehicle Power Lines," *IEEE International Symposium on Power Line Communications and Its Applications (ISPLC)*, pp. 325-330, 2010.

(Continued)

*Primary Examiner* — Adolf Dsouza
(74) *Attorney, Agent, or Firm* — Oliff PLC

(57) ABSTRACT

A power line communication system is provided in which the influence of the impulsive noise unexpectedly generated on a power line which is a communication medium can be reduced according to the characteristics of the impulsive noise by an existing method and power line communication can be realized without a hindrance. A transmitter is constituted by: a modulator for conveying a LIN data signal by a power line; a filter that allows a signal of a predetermined band to pass therethrough; and a sinusoidal wave outputter (sinusoidal wave in the figure). In contrast, the receiver is constituted by the sinusoidal wave outputter, the filter and a demodulator that performs demodulation. To the power line, a limiter that limits the amplitude of the propagating signal to a predetermined amplitude (reception signal amplitude) is connected.

5 Claims, 18 Drawing Sheets

(51) Int. Cl.
*H04B 3/54* (2006.01)
*H04L 27/20* (2006.01)

(56) References Cited

U.S. PATENT DOCUMENTS

| | | | |
|---|---|---|---|
| 2005/0063479 | A1 | 3/2005 | Propp et al. |
| 2006/0116095 | A1* | 6/2006 | Henriksson ............. 455/223 |
| 2007/0036239 | A1* | 2/2007 | Ma et al. .................... 375/316 |
| 2007/0265036 | A1* | 11/2007 | Kawasaki .............. 455/562.1 |
| 2009/0306844 | A1* | 12/2009 | Arita et al. .................. 701/29 |
| 2011/0176664 | A1 | 7/2011 | Propp et al. |
| 2012/0131411 | A1 | 5/2012 | Mumtaz et al. |

FOREIGN PATENT DOCUMENTS

| | | |
|---|---|---|
| JP | A-2006-304086 | 11/2006 |
| JP | A-2007-228203 | 9/2007 |
| JP | A-2007-258908 | 10/2007 |
| JP | A-2011-135555 | 7/2011 |
| WO | WO 2010/112606 A2 | 10/2010 |

OTHER PUBLICATIONS

Ndo et al., "An Adaptive Procedure for Impulsive Noise Mitigation over Power Line Channels," *IEEE Global Telecommunications Conference*, GLOBECOM, pp. 1-6, 2009.

Nov. 15, 2011 International Search Report issued in International Patent Application No. PCT/JP2011/073820.

* cited by examiner

F I G. 7
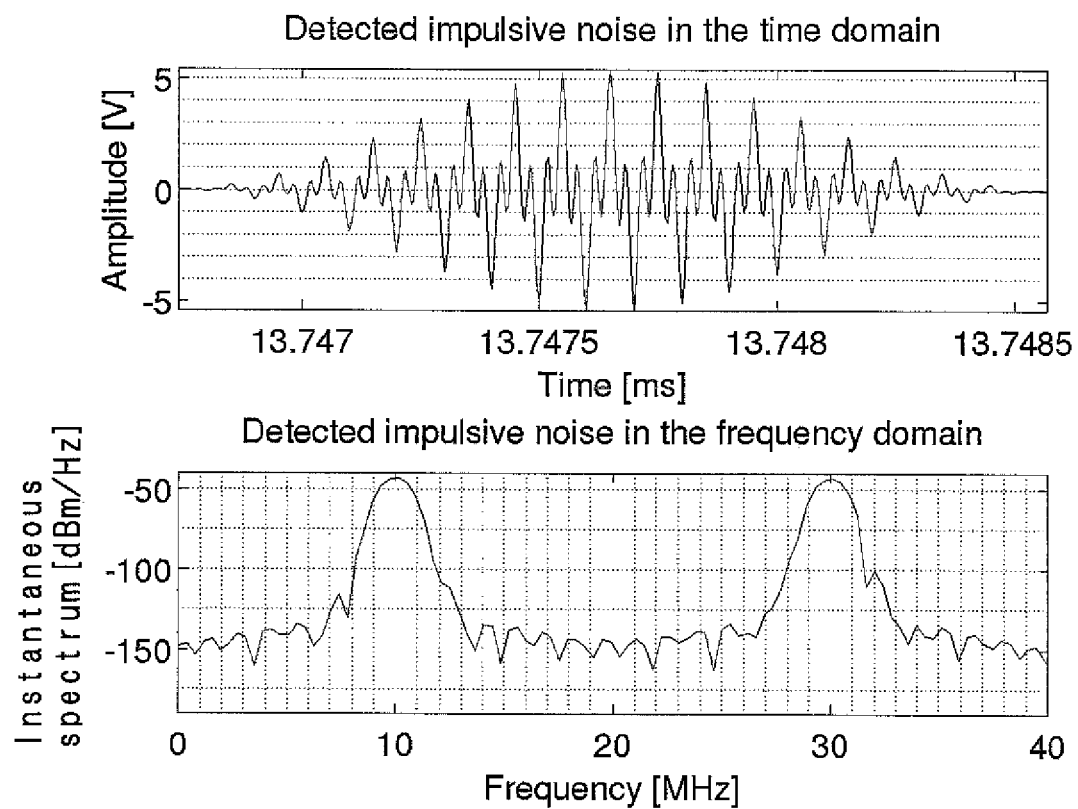

F I G. 1 2
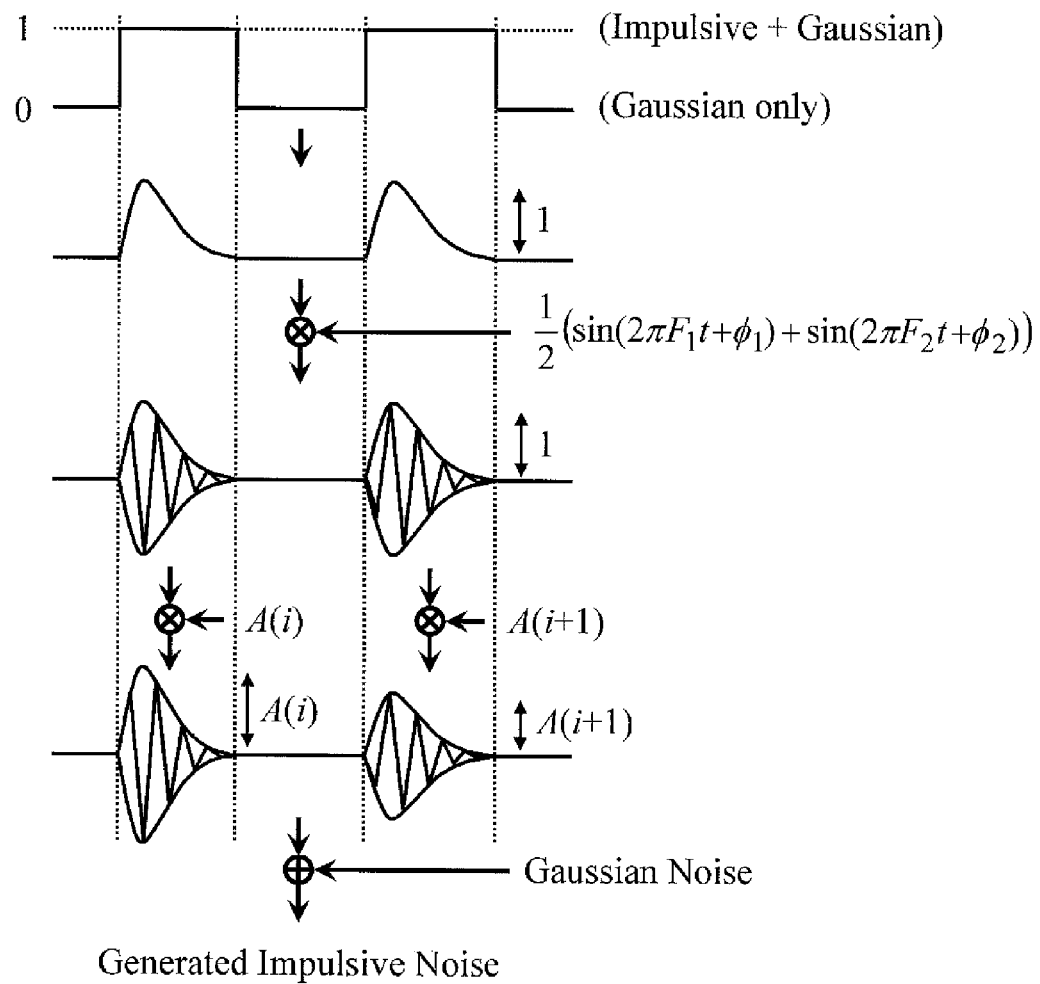

F I G. 1 3
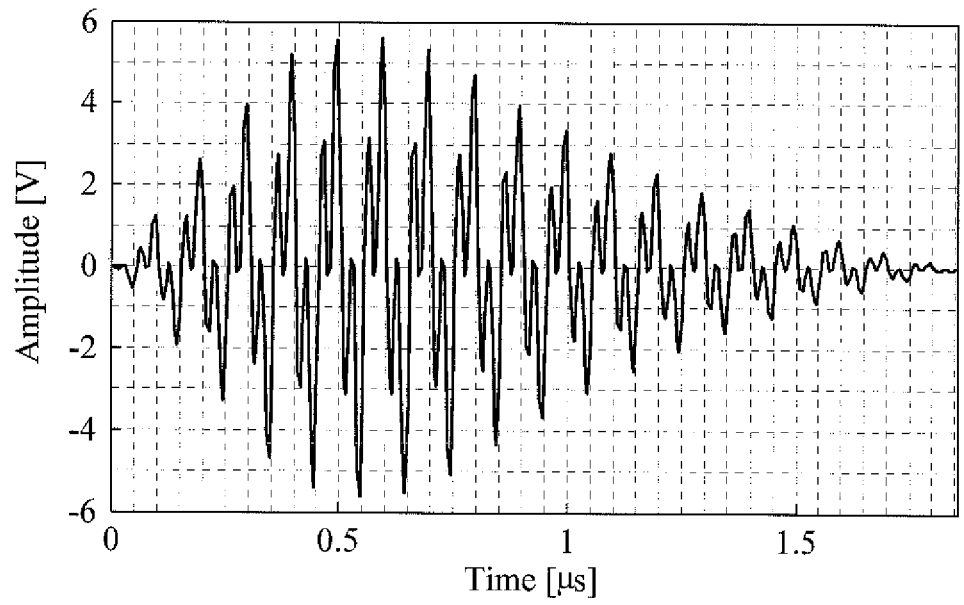
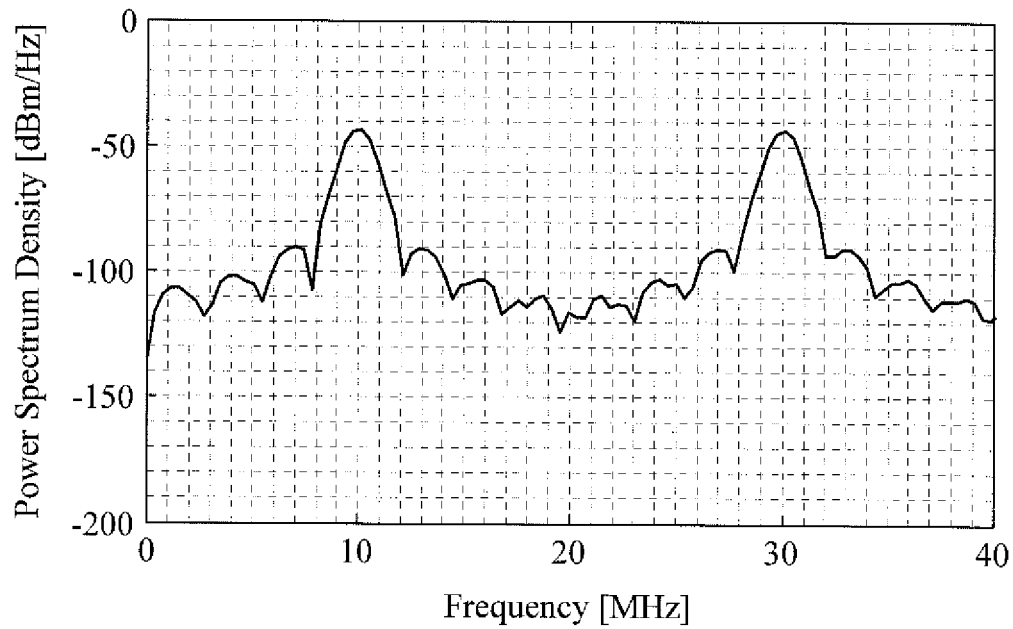

POWER LINE COMMUNICATION SYSTEM

This application is the national phase under 35 U.S.C. §371 of PCT International Application No. PCT/JP2011/073820 which has an International filing date of Oct. 17, 2011 and designated the United States of America.

FIELD

The present invention relates to a communication system including a plurality of communication devices. In particular, the present invention relates to a power line communication system in which when a power line is used as a communication medium, communication can be performed with a reduced influence of the impulsive noise generated unexpectedly from an actuator connected to the power line.

BACKGROUND

In recent years, in various fields, a system has been used in which a plurality of communication devices are connected and the communication devices are each assigned a function, exchange data with one another and perform various processes in cooperation. In the communication system, a noise generated on a communication medium connecting the communication devices affects the communication quality. Therefore, it is necessary to take measures for preventing the noise or to realize communication so as not to be affected by the noise.

In the field of in-vehicle LANs (Local Area Networks) disposed in vehicles, by using ECUs (Electronic Control Units) which are communication devices and causing the ECUs to perform specialized processes to exchange data with one another, various functions are implemented as a system. Vehicle control has been shifted from mechanical control to electric control and the functions of the ECUs are specialized to increase the number of functions implemented in the system. Consequently, the number and type of communication devices increase and the number of communication lines (in-vehicle harness) connecting the communication devices also increases. Moreover, an increase in the amount of data transmitted and received in the communication system makes it necessary to transmit and receive large amounts of data faster.

In the field of vehicles, it is particularly desired to improve fuel economy by reducing the vehicle weight or to reduce driving power. It is also desired to improve passenger comfort by increasing in-vehicle space. Therefore, it is required to reduce the weight of the in-vehicle harness by reducing the number of communication lines used for the in-vehicle LAN.

For this reason, PLC (Power Line Communication) in which a carrier wave for communication is superimposed on an existing power line to realize communication is drawing attention, and its application to in-vehicle LANs has been proposed (for example, see Patent Document 1). By applying PLC to in-vehicle LANs, saving of lines is realized, which enables the reduction in the weight of the in-vehicle harness.
Patent Document 1: Japanese Patent Application Laid-Open No. 2006-067421

SUMMARY

For the impulsive noise, neither a detailed analysis nor a consideration of a workaround has been provided for (in-vehicle) PLC because the influence can be reduced by measures such as performing data retransmission. However, particularly in the field of vehicles, an actuator which operates in an event-driven manner is connected to a power line serving as a communication medium, and further, according to the contents of the transmitted and received data, it is required that the data is transmitted and received with low delay and high reliability for safety. For a regularly generated impulsive noise, it is necessary only to underestimate the reliability of the signal during a regular certain period. For example, in the case of indoor PLC, it is known that the generation period of impulsive noise is synchronized with the period of the commercial power, and by performing detection based on the period, impulsive noise can be detected with relatively high accuracy, and this can be avoided. On the other hand, for example, locking and unlocking of the electric door lock of a vehicle are performed in response to an operation corresponding to turning on and off a switch by a driver or a passenger, and by turning on and off the switch for the door lock, and an impulsive noise is generated from a door lock actuator or the like connected to a power line which is a communication medium; therefore, the temporal characteristic as described above cannot be learned.

When an in-vehicle PLC is realized, it is more desirable to realize it at relatively low cost by using a conventional communication protocol and in-vehicle communication devices rather than by creating a new communication protocol and hardware for communication.

The present invention is made in view of such circumstances, and an object of the present invention is to provide a power line communication system in which communication can be performed while the influence is reduced of the impulsive noise unexpectedly generated on a power line which is a communication medium from an actuator connected to the power line.

A power line communication system according to a first aspect of the invention is characterized in that in a communication system in which a plurality of communication devices mounted on a vehicle perform communication through a power line routed in the vehicle, an amplitude limiter is provided, which limits amplitude of a signal propagating on the power line to within a predetermined amplitude value, and the communication devices modulate, by phase shift modulation, a data signal of a carrier frequency different from a frequency of an impulsive noise generated on the power line.

An impulsive noise of an attenuating sinusoidal wave which exhibits a high amplitude at the time of generation and attenuates thereafter is generated on a power line serving as a transmission line. This impulsive noise has a very high amplitude, and the time required from the generation to the attenuation is at most approximately 10 μs. If the symbol duration of the data signal is sufficiently long for the attenuating sinusoidal wave, it becomes possible that the carrier frequency of the data signal mitigates the influence of the high amplitude of the impulsive noise by the amplitude limiter.

A finding has been obtained that when communication is performed by a power line routed in a vehicle, an impulsive noise of an attenuating sinusoidal wave is generated with arbitrary timing and intensively by an aperiodic operation of an actuator connected to the power line. In such a communication by the in-vehicle PLC, particularly, a phase modulation method and an amplitude limiter enable the influence of the impulsive noise to be effectively mitigated. As the protocol of the in-vehicle communication in which the symbol duration is sufficiently long for the generation duration of the impulsive noise, a LIN (Local Interconnect Network) the communication rate of which is up to 20 kbit/s is preferable.

A power line communication system according to a second aspect of the invention is characterized in that in a communication system in which a plurality of communication devices mounted on a vehicle perform communication through a power line routed in the vehicle, an amplitude limiter is provided, which limits amplitude of a signal propagating on the power line to within a predetermined amplitude value, the communication devices include a plurality of first communication devices which modulate a data signal of a first carrier frequency by phase shift modulation and perform low-speed communication through the power line and a plurality of second communication devices which modulate, by the phase shift modulation, a data signal of a second carrier frequency different from the first carrier frequency and perform high-speed communication through the power line, the first carrier frequency is closer to a frequency of an impulsive noise generated on the power line rather than the second carrier frequency, and a symbol duration of the signal modulated by the first communication devices is longer than a duration of the impulsive noise.

The present invention employs a structure in which a group of the first communication devices for performing power line communication at the first carrier frequency and a group of the second communication devices for performing power line communication at the second carrier frequency perform power line communication by using a common power line, a structure in which so-called multiplex communication is performed. When the communication rates are compared, if the first communication devices perform low-speed communication and the second communication devices perform high-speed communication, the carrier frequencies are set so that the first carrier frequency is close to the (peak) frequency of the impulsive noise and the second carrier frequency is far from the frequency of the impulsive noise. The first carrier frequency may be the same as the frequency of the impulsive noise. Moreover, the symbol duration of the modulation signal of the first communication devices is set so as to be longer than the impulsive noise.

By these, in the power line communication performed by the first communication devices, even when the first carrier frequency is close to (or the same as) the frequency of the impulsive noise, because of the effect of limiting the amplitude of the impulsive noise by the amplitude limiter and since the symbol duration is longer than the impulsive noise, normal communication can be performed without affected by the impulsive noise. Moreover, since the first carrier frequency can be made close to the frequency of the impulsive noise, the second carrier frequency used in the high-speed communication by the second communication devices which can be affected by the impulsive noise can be made far from the frequency of the impulsive noise, so that the communication by the second communication devices can be prevented from being hindered by the impulsive noise.

The power line communication system according to a third aspect of the invention is characterized in that the phase shift modulation is BPSK (Binary Phase Shift Keying) and the communication devices receive the data signal by a synchronized detection method.

According to the present invention, by adopting the BPSK method and the synchronized detection method, a PLC system can be realized by using an existing communication device.

The power line communication system according to a fourth aspect of the invention is characterized in that the phase shift modulation is DBPSK (Differential Binary Phase Shift Keying) and the communication devices receive the data signal by a delay detection method.

According to the present invention, by adopting the DBPSK method and the delay detection method, a PLC system can be realized by using an existing communication device.

The power line communication system according to a fifth aspect of the invention is characterized in that the predetermined amplitude value is predetermined based on a characteristic of the impulsive noise generated on the power line.

According to the present invention, the predetermined amplitude value limited by the amplitude limiter is determined based on the characteristics of the impulsive noise speculated to be generated in the communication system, whereby the influence of the impulsive noise can be removed more accurately. Particularly in in-vehicle PLC, the characteristics of the impulsive noise generated on the power line serving as the transmission line can be conspicuous according to the circuit configuration. Consequently, the influence of the noise characteristics according to the circuit configuration of the communication system, particularly, the impulsive noise characteristics related to the amplitude can be effectively removed.

The power line communication system according to a sixth aspect of the invention is characterized in that the predetermined amplitude value is not more than twice the amplitude value of the signal transmitted and received between the communication devices.

According to the present invention, the predetermined amplitude value limited by the amplitude limiter is not more than twice the amplitude value of the signal transmitted and received between the communication devices (the signal modulated and superimposed on the power line). The inventors of the present application investigated the characteristics of the impulsive noise generated on the power line of a vehicle, modelized these characteristics, and performed simulations. In these simulations, a result was obtained that the influence of the impulsive noise could be sufficiently reduced when the amplitude value limited by the amplitude limiter was twice the amplitude value of the transmission and reception signal. From this, by limiting the amplitude to not more than twice the amplitude value of the transmission and reception signal, a power line communication which is free from the influence of the impulsive noise can be realized.

In the case of the present invention, the influence of the impulsive noise unexpectedly generated on the power line which is the communication medium can be mitigated according to the characteristics of the impulsive noise by the existing methods, so that power line communication can be realized without a hindrance. In particular, when the characteristics of the impulsive noise from a generation source connected to the power source is conspicuous, communication avoiding this can be performed.

The above and further objects and features will more fully be apparent from the following detailed description with accompanying drawings.

BRIEF DESCRIPTION OF THE DRAWINGS

FIG. 7 is graphs showing the characteristics of the impulsive noise used for the simulations.

FIG. 12 is an explanatory view conceptually showing the method of creating the noise used for the simulations.

FIG. 13 is graphs showing the characteristics of the impulsive noise used for the simulations.

DETAILED DESCRIPTION

Hereinafter, the present invention will be concretely described based on the drawings showing embodiments thereof.

In the embodiments described below, description will be given with an example in which the present invention is applied to an in-vehicle PLC system that realizes communication among the ECUs mounted on a vehicle by PLC.

First Embodiment

Figure 1:
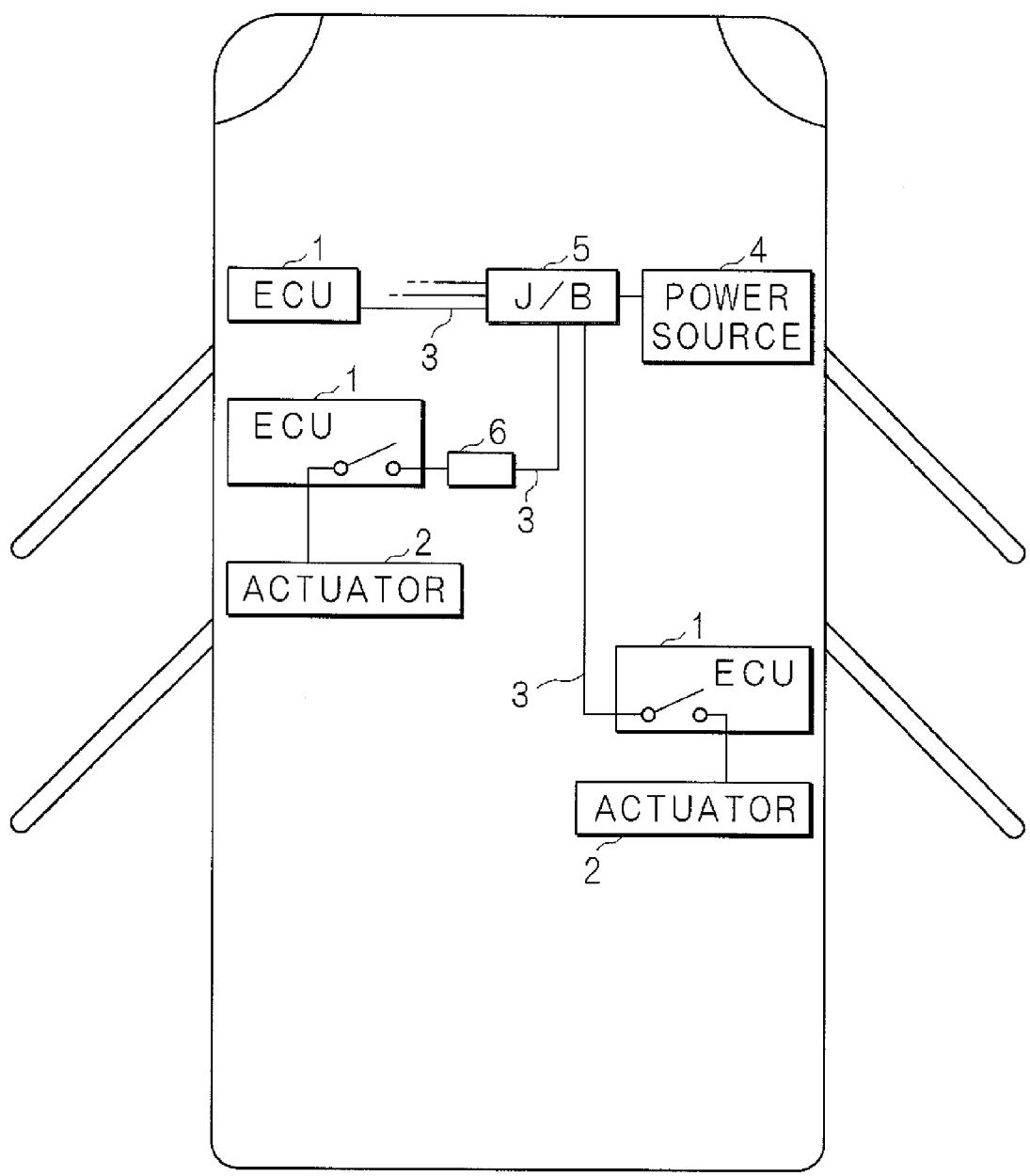
FIG. 1 is a block diagram showing the structure of an in-vehicle PLC system of an embodiment.

FIG. 1 is a block diagram showing the structure of an in-vehicle PLC system of an embodiment. The in-vehicle PLC system of the embodiment includes: a plurality of ECUs 1 as communication devices disposed in the vehicle; a plurality of actuators 2 which operate by being controlled by the ECUs 1; a power line 3 that transmits power to the ECUs 1 and the actuators 2; a power source 4 which supplies power to the ECUs 1 and the actuators 2; a junction box (J/B in the FIG. 5 for branching and relaying the power line 3; and a limiter 6 connected to the power line 3.

The ECUs 1 as which microcomputers are used are devices which receive power supply through a power circuit and perform transmission and reception of data by PLC and control of the operations of non-illustrated other components. The ECUs 1 each operate as a transmitter and a receiver, and exchange data with one another. The ECUs 1 of the embodiment have the function of a LIN (Local Interconnect Network) controller, and the communication protocol among the ECUs 1 is LIN.

The power source 4 is an alternator which obtains power from the engine to generate power or a battery charged by the alternator, the minus terminal thereof is grounded, and the plus terminal thereof is connected to the junction box 5 through the power line 3. The power source 4 supplies a driving voltage of, for example, 12 V to the ECUs 1 or the actuators 2.

The junction box 5 is provided with a branching and relaying circuits for the power line 3. To the junction box 5, a plurality of power lines 3 are connected so as to branch off. These power lines 3 are connected to the ECUs 1 and the actuators 2, respectively. A switch is built in each ECU 1 so that the on and off of the connection relay to the actuators 2 is controlled by the ECUs 1 controlling the actuators 2. When the switch is on, power from the power source 4 is supplied to the actuators 2 so that the actuators 2 operate.

The ECUs 1 and the actuators 2 are each structured so that in the inside thereof, the power line 3 connected thereto is connected (grounded) to the body earth through the components and load included in itself.

In the thus structured in-vehicle PLC system, the ECUs 1 not only receive power supply from the power source 4 through the power lines 3 to operate but also superimpose a carrier wave for communication on the power lines 3 to transmit and receive data for control. Thereby, in the in-vehicle PLC system of the embodiment, it is unnecessary to separately cable, among the ECUs 1 in the vehicle, a signal line for communication to transmit and receive data used for cruise control, video data or the like. Consequently, saving of lines and reduction in the weight of the harness can be realized.

As shown in FIG. 1, since the actuator 2 is connected to the power line 3 by which the ECUs 1 perform data communication, an impulsive noise is generated in an event-driven manner on the power line 3. One of the actuators is, for example, a door lock motor that starts locking of doors of the vehicle. When the ECU 1 controlling the door lock motor turns on the switch to start the door lock motor, the door lock motor rotates, for example, for 95 milliseconds, and during that time, a multiplicity of impulsive noises are generated on the power line. A principal cause of the impulsive noise is the brush discharge of the motor, and after approximately 95 milliseconds, the generation frequency of the impulsive noise is sufficiently low. Since the on/off timing of the switch of the door lock motor is arbitrary timing, to avoid the impulsive noise caused by the door lock motor, instead of temporal avoidance, it is necessary to make the carrier frequency of the communication signal different from the frequency of the impulsive noise or to select a communication method that is not readily affected.

Therefore, in the in-vehicle PLC system of the embodiment, to avoid the influence of the impulsive noise generated on the power line 3, the modulation method of the carrier wave of the communication is defined, and the limiter 6 is included. Hereinafter, the structure of a transmitter 11 and a receiver 12 and the structure of the limiter 6 which the ECUs 1 have to be provided with to avoid the influence of the impulsive noise generated on the power line 3 will be described. Then, results of examinations as to whether a communication in which the influence of the impulsive noise is avoided can be realized by the structures will be described.

Figure 2:
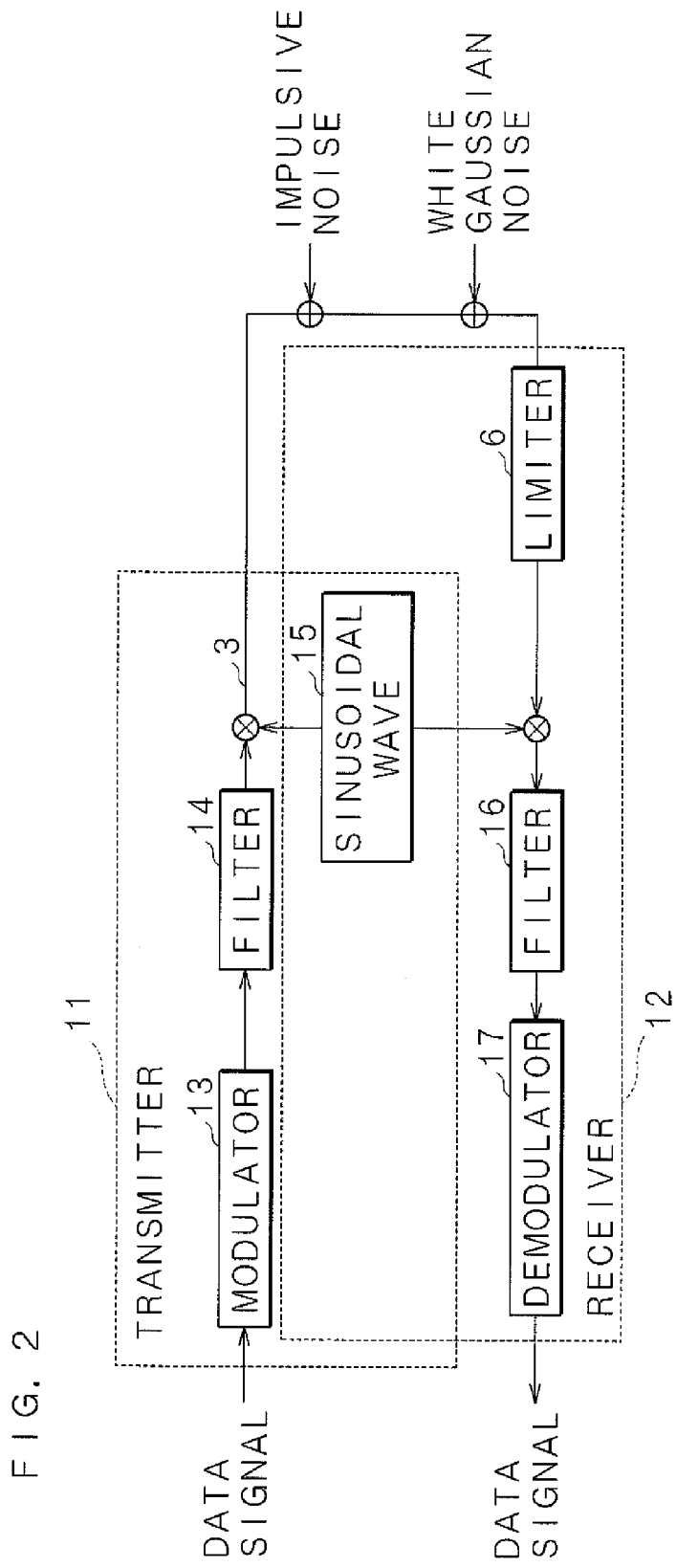
FIG. 2 is a block diagram schematically showing the connection structure of a transmitter and a receiver included in the in-vehicle PLC system of the embodiment.

FIG. 2 is a block diagram schematically showing the connection structure of the transmitter 11 and the receiver 12 included in the in-vehicle PLC system of the embodiment.

In the ECU 11, the data signal outputted so as to transmit data to another ECU 1 by the function of a LIN controller is inputted to the transmitter 11 for performing communication in PLC. Likewise, the data signal received by the receiver 12 is notified to a processor constituting the ECU 1 by the function of the LIN controller, which enables transmission and reception with the power line 3 as the LIN bus.

Figure 15:
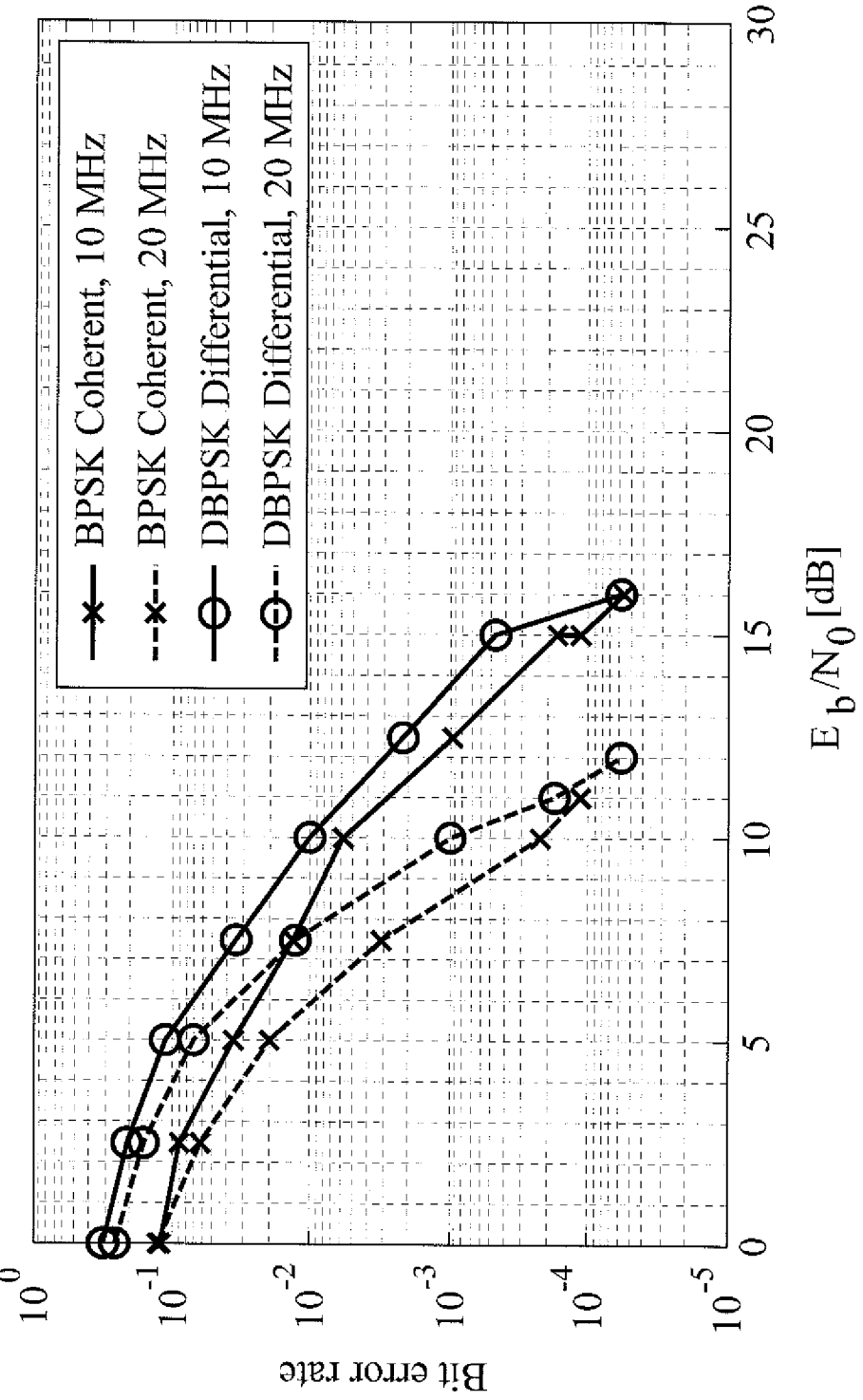
FIG. 15 is a graph showing the characteristics of the communication errors obtained by the simulations.

The transmitter 11 is constituted by: a modulator 13 for transmitting a LIN data signal by the power line 3; a filter 14 which allows a signal of a predetermined band to pass therethrough; and a sinusoidal wave outputter (sinusoidal wave in the FIG. 15. In contrast, the receiver 12 is constituted by the limiter 6, the sinusoidal wave outputter 15, the filter 16 and a demodulator 17 performing demodulation.

The modulator 13 modulates the data signal inputted from another component in the ECU 1 by BPSK (Binary Phase Shift Keying) or DBPSK (Differential Binary Phase Shift Keying) and outputs the signal. For example, the frequency Fc of the carrier wave used for modulation may be 20 MHz or 10 MHz. In contrast, the demodulator 17 demodulates the data signal from the carrier wave.

As the filter 14 and the filter 16, root roll-off filters are used, and the roll-off rate is 0.5.

The sinusoidal wave outputter 15 outputs a sinusoidal wave $\sin(2\pi Fct)$ by which the carrier wave is to be multiplied.

The thus structured transmitter 11 modulates the data signal by the BPSK method or the DBPSK method, and the receiver 12 receives the data signal by a synchronized detection or delay detection method (when the transmitter 11 performs BPSK modulation, the receiver 12 receives the data signal by the synchronized detection method, while when the transmitter 11 performs DBPSK modulation, the receiver 12 receives the data signal by the delay detection method).

Figure 3:
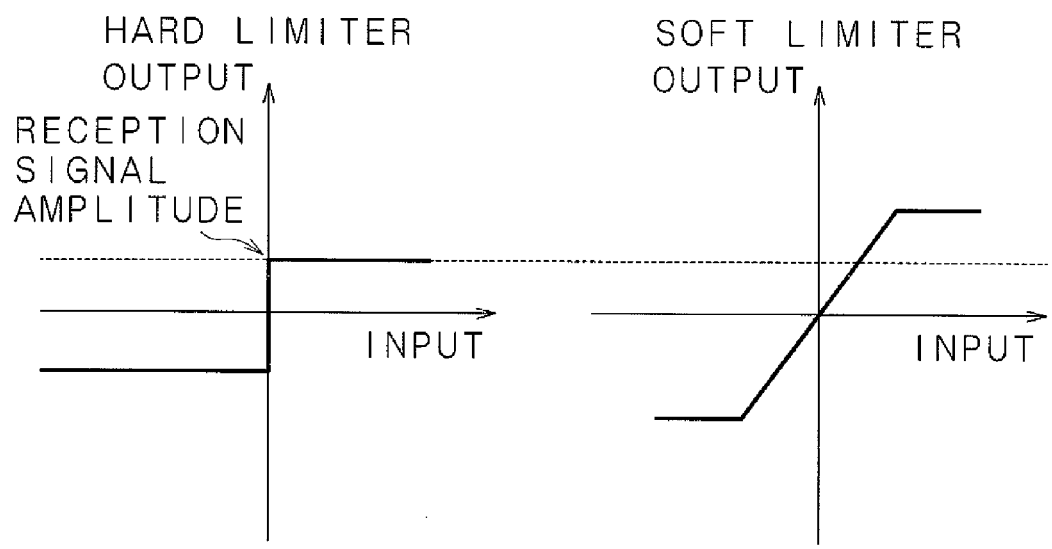
FIG. 3 is graphs showing the input-output characteristics of a limiter of the embodiment.

The limiter 6 limits the amplitude of the signal propagated to the power line 3 to a predetermined amplitude (reception signal amplitude). FIG. 3 is graphs showing the input-output characteristics of the limiter 6 of the embodiment. In each of the two graphs shown in FIG. 3, the horizontal axis represents the amplitude level of the inputted signal, the vertical axis represents the amplitude level of the outputted signal, the rightward direction and the upward direction are positive, and the downward direction and the leftward direction are negative.

The limiter 6 of the embodiment has characteristics of a hard limiter shown in the left of FIG. 3. As shown in FIG. 3, even if the amplitude of the inputted signal is higher than the amplitude of the reception signal, the limiter 6 outputs the signal with the amplitude of the reception signal.

As the limiter 6, one having characteristics of a soft limiter shown in the right of FIG. 3 may be used. In the case of the soft limiter, the amplitude is limited to up to twice the amplitude of the reception signal. In this case, when the amplitude of the inputted signal is not more than twice the amplitude of the reception signal, the limiter 6 outputs the signal as it is, and when the amplitude is higher than twice the amplitude of the reception signal, the limiter 6 outputs the signal with amplitude twice the amplitude of the reception signal.

Moreover, the limiter 6 may be disposed between a multiplier and the filter 16 or between the filter 16 and the demodulator 17 as well as disposed upstream from the multiplier as shown in FIG. 2.

Figure 4:
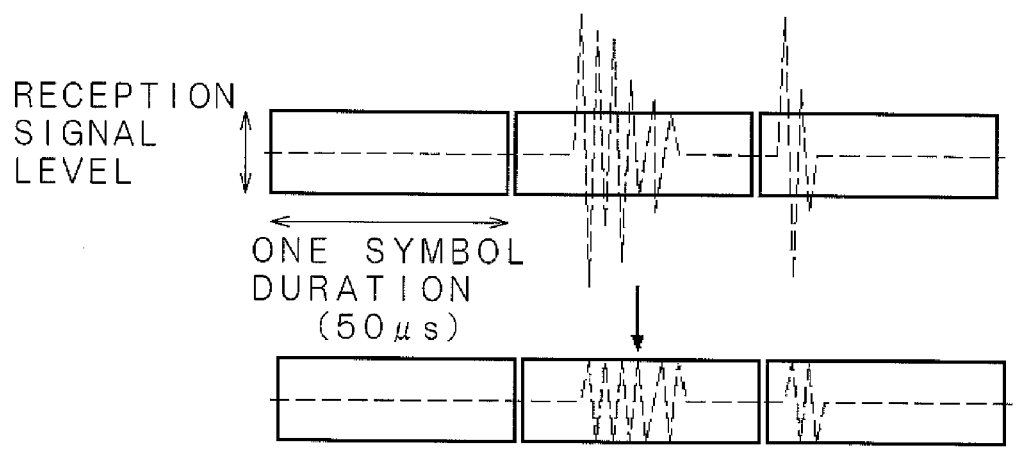
FIG. 4 is an explanatory view conceptually showing the effect of mitigating the influence of impulsive noise by the limiter included in the in-vehicle PLC system of the embodiment.

FIG. 4 is an explanatory view conceptually showing the effect of mitigating the influence of the impulsive noise by the limiter 6 included in the in-vehicle PLC system of the embodiment. The waveforms shown by the broken lines in FIG. 4 represent impulsive noise, and the horizontal lines of the thick-line rectangles represent the symbol duration of one symbol of a data signal based on LIN, and the vertical lines thereof represent the amplitude value of the reception signal. The waveform of the impulsive noise after the amplitude is limited by the limiter 6 is shown in the lower part in FIG. 4.

As shown in FIG. 4, the transmission capacity of LIN is at most 20 kbit/s (one symbol duration is 50 μs), and the symbol duration is sufficiently long for one width representative of amplitude where the impulsive noise is high. Therefore, by limiting the amplitude by the limiter 6, the influence on one symbol can be more effectively mitigated. Processing may be performed in which the magnitude of the signal level in each symbol is determined with sampling timing sufficiently shorter than the symbol duration and a larger number of determination results are fixed as the signal level.

Figure 5:
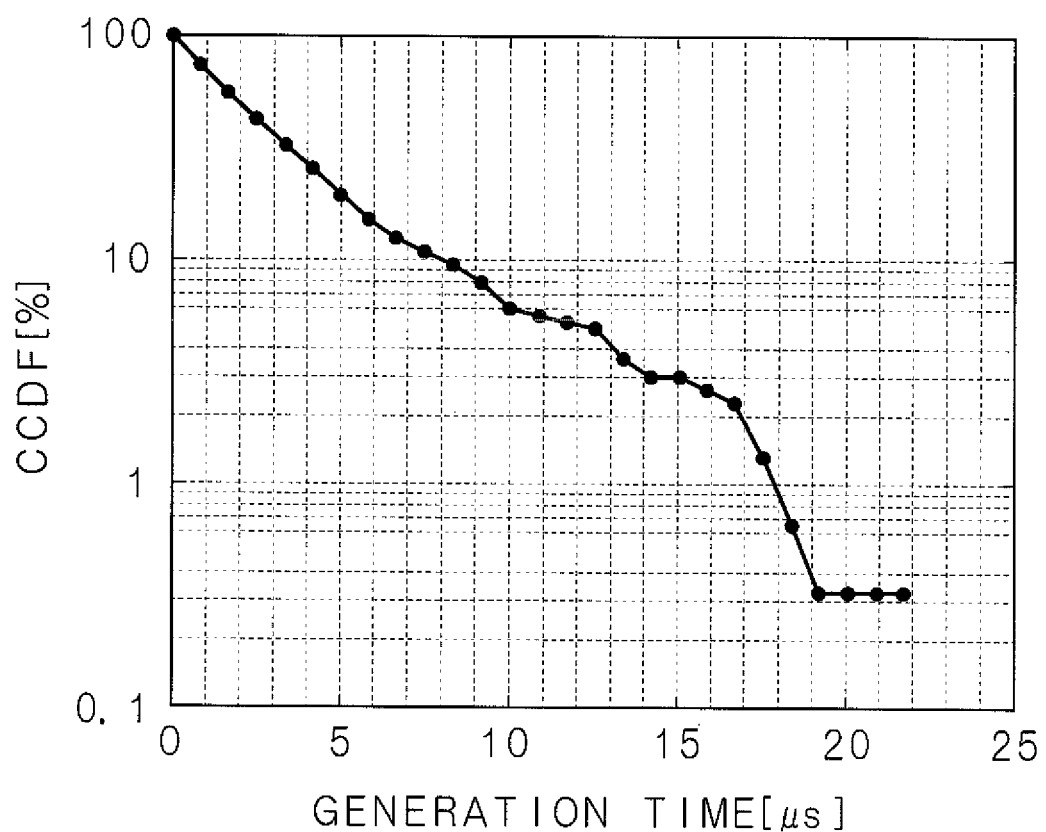
FIG. 5 is a graph showing the measurement result of the generation time of the impulsive noise.

FIG. 5 is a graph showing the measurement result of the generation time of the impulsive noise which result was obtained by actually measuring the generation time of the impulsive noise generated on the power line 3 in a vehicle. In FIG. 5, the horizontal axis represents the generation time [μs] of the impulsive noise, and the vertical axis represents the value [%] of the complementary cumulative distribution function (CCDF).

As shown in FIG. 5, a measurement result was obtained such that the generation time of not less than approximately 99% of the detected impulsive noise was not more than approximately 18 μs (that is, the percentage of the impulsive noise of not less than 18 μs was not more than approximately 1%). From this, it is found that 50 μs which is the symbol duration of LIN is sufficiently long for the generation time of the impulsive noise generated in a vehicle. By setting the symbol duration of the signal transmitted on the power line to a duration sufficiently long for the generation time of the impulsive noise, the influence of the impulsive noise can be effectively mitigated.

Returning to FIG. 2, description will be continued.

The transmitter 11 and the receiver 12 are structured as shown in FIG. 2, and the signal transmitted from the transmitter 11 is transmitted on the power line 3. Since a plurality of actuators 2 are connected to the power line 3, they become a noise source of impulsive noise and the impulsive noise is added to the carrier wave. Moreover, to the inputs of the transmitter 11 and the receiver 12 of each ECU 1, additive white Gaussian noise (AWGN) is added to the carrier wave.

When the carrier wave to which the impulsive noise and the additive white Gaussian noise have been added is inputted to the limiter 6, the limiter 6 limits the amplitude to the amplitude of the reception signal as shown in FIG. 3 and outputs the carrier wave. Thereby, the influence of the impulsive noise is mitigated.

The carrier wave outputted from the limiter 6 arrives at the multiplier in the receiver 12. The multiplier in the receiver 12 multiplies the arrived carrier wave by a sinusoidal wave from the sinusoidal wave outputter 15, causes it to pass through the filter 16, and then, demodulates it at the demodulator 17 and notifies it to the processor as a data signal in the ECU 1.

As described above, the transmitter 11 uses BPSK or DBPSK as the modulation method, demodulation is performed by using synchronized detection or delay detection at the receiver 12 and the limiter 6 is connected to the power line 3 which is the transmission line, whereby communication by LIN can be realized in PLC.

Next, it will be examined whether or not a communication where the influence of the impulsive noise is avoided in the vehicle PLC system of the embodiment can be realized by providing the transmitter 11 and the receiver 12 structured as shown in FIG. 2 and providing the limiter 6.

Whether the communication where the influence of the impulsive noise is avoided can be realized or not is evaluated based on the BER (Bit Error Rate) when a predetermined impulsive noise is generated by simulations in a structure including the transmitter 11, the receiver 12 and the limiter 6 shown in FIG. 2.

Figure 6:
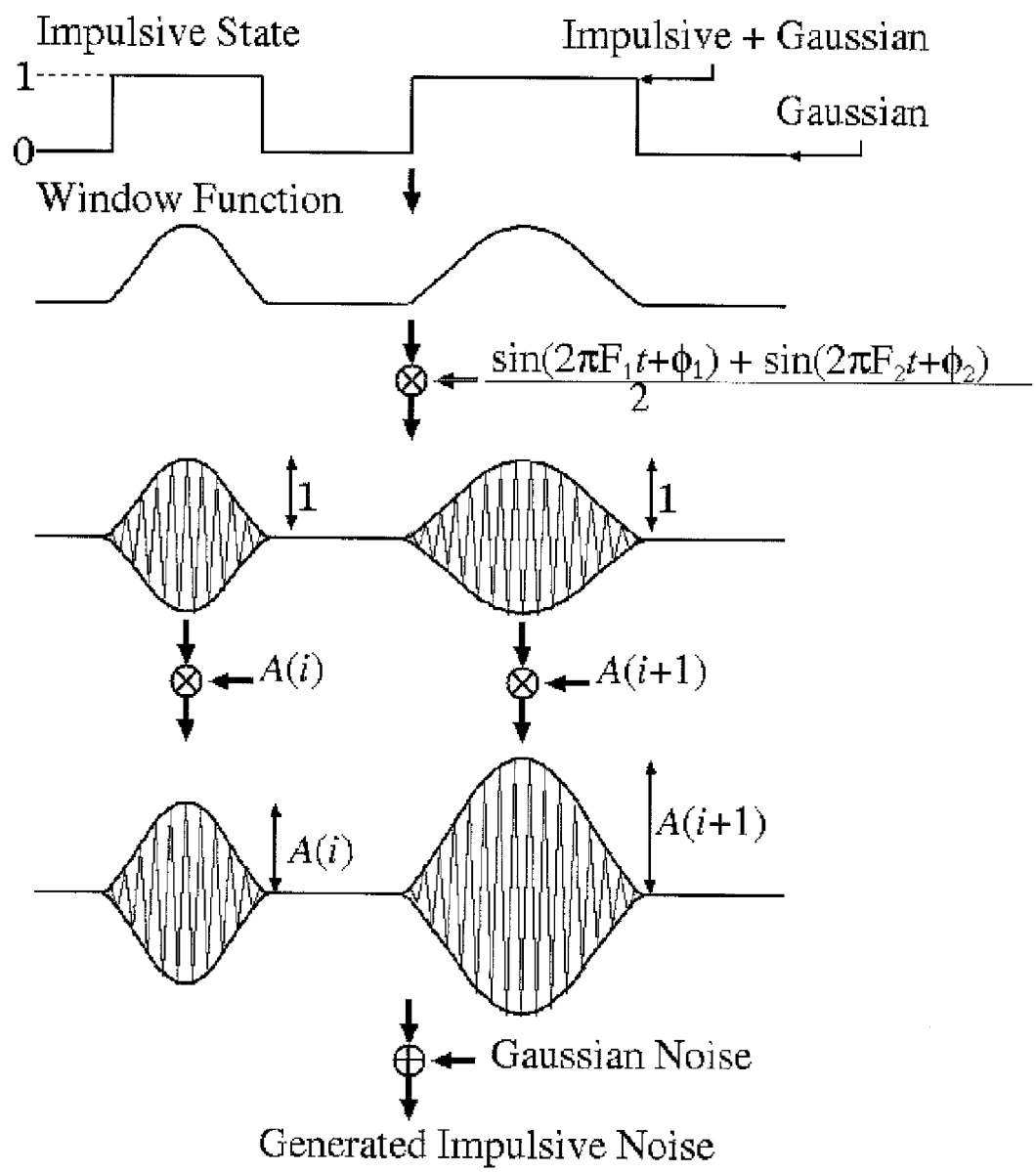
FIG. 6 is an explanatory view conceptually showing the method of creating a noise used for simulations.

A noise including the impulsive noise generated by the simulations was created. FIG. 6 is an explanatory view conceptually showing the method of creating the noise used for the simulations.

To create the impulsive noise, first, the noise including the impulsive noise generated on the power line 3 to which the door lock motor is connected as the actuator 2 is actually measured. However, it is very difficult to truly detect the impulsive noise from the measured noise and reproduce it. Therefore, an estimated state matrix is obtained in which results of the following estimation are arranged in chronological order: an estimation, using a hidden Markov Gaussian model and a BW-MAP method, of which of the two states of a state where the impulsive noise is generated and a state where it is not generated is the state, in each sampling timing, of the noise obtained by the measurement. Moreover, it was found that the frequency of the generated impulsive noise had peaks at 10 MHz and 30 MHz. Thereafter, the impulsive noise is created by using characteristics such as the obtained estimated state matrix and the frequency of the impulsive noise.

The waveform shown in the uppermost graph in FIG. 6 is the estimated state matrix shown as a rectangular wave, and one state of the duration of one rectangular wave corresponds to a duration where it is determined that an impulse is continuously generated. "0" is a state where the impulsive noise is not generated (only the additive white Gaussian noise) and "1" is a state where the impulsive noise is generated (mixture of the impulsive noise and the additive white Gaussian noise). As shown in FIG. 6, in the in-vehicle PLC, a state where the impulsive noise is generated continues in continuous intervals. This is because the impulsive noise generated in the in-vehicle PLC is an attenuating sinusoidal wave as shown in FIG. 4.

Then, as shown in the second graph from the top of FIG. 6, the interval where the impulsive noise was generated (interval where "1" continued) was replaced with a window function having the same duration as the interval. As the window function, a hanning window was used.

Then, since it is found that the frequency period of the impulsive noise has peaks at 10 MHz and 30 MHz as mentioned above, in order that the created impulsive noise also has peaks at the two frequencies of 10 MHz and 30 MHz, $W_2(t)$ which is the window function $W_1(t)$ multiplied by the sum of the sinusoidal waves of the two frequencies $F_1$ and $F_2$ is obtained (Expression 1). The phases of the two sinusoidal waves are $\phi_1$ and $\phi_2$, respectively, and each takes a random phase in the range of 0 to $2\pi$. These phases are randomly and independently determined for each detection interval.

[Expression 1]

$$W_2(t) = W_1(t) \times \frac{\sin(2\pi F_1 t + \phi_1) + \sin(2\pi F_2 t + \phi_2)}{2} \quad (1)$$

Then, the maximum value of the amplitude of the created impulsive noise was made to coincide with the amplitude of the measured impulsive noise in each interval. That is, the function $W_2(t)$ where the amplitude was normalized to "1" was multiplied by the amplitude A(i) of the measured impulsive noise. A(i) in FIG. 6 is the absolute value of the maximum amplitude of the impulsive noise which is the attenuating wave measured i-thly.

Lastly, the additive white Gaussian noise according to the characteristics of the receiver 12 was added as the background noise to obtain the noise used for the simulations.

FIG. 7 is graphs showing the characteristics of the impulsive noise used for the simulations. The waveform of one impulsive noise is shown in the upper graph, and the frequency characteristic is shown in the lower graph. Since the window function is used, the impulsive noise of the created noise exhibits a bilaterally symmetric waveform having a high amplitude in the middle as shown in the upper graph of FIG. 7 and attenuates. Moreover, as shown in the lower graph of FIG. 7, the frequency of the created impulsive noise has peaks at 10 MHz and 30 MHz similarly to the actually measured impulsive noise.

Figure 8:
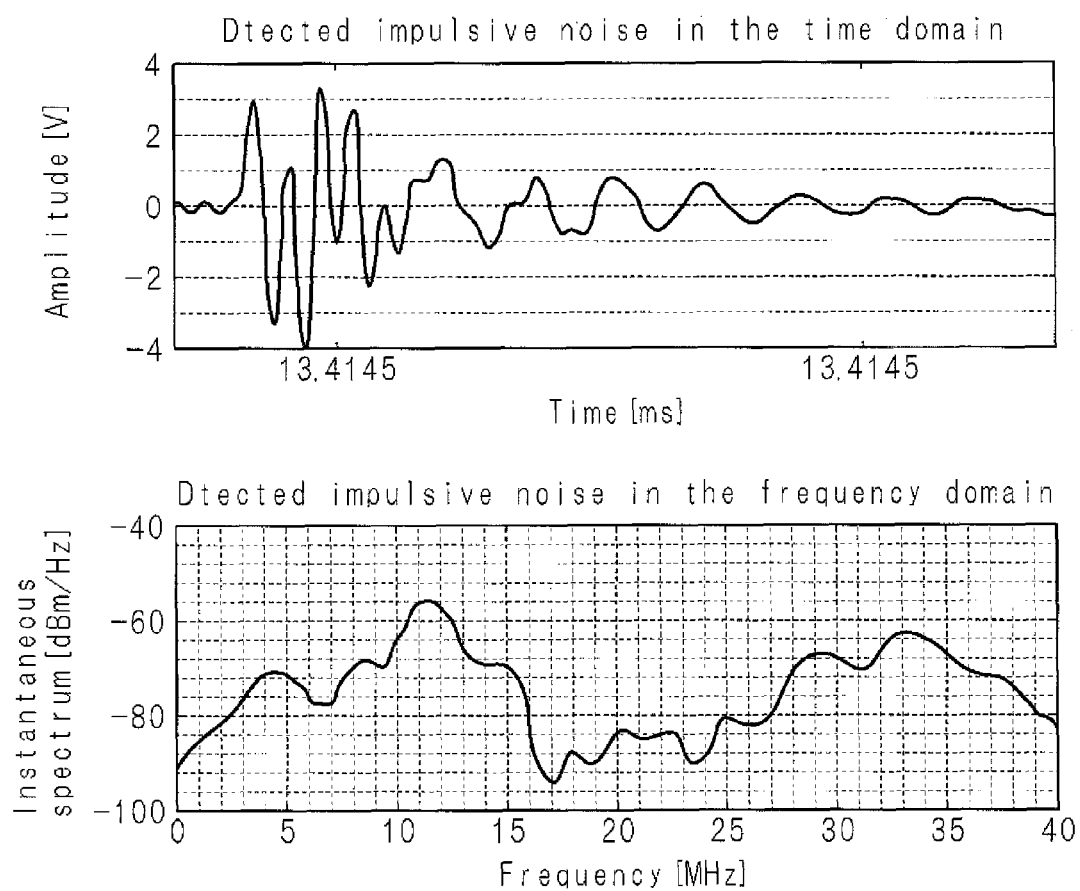
FIG. 8 is graphs showing the measurement results of the characteristics of the impulsive noise.

FIG. 8 is graphs showing the measurement results of the characteristics of the impulsive noise which results were obtained by actually measuring the impulsive noise generated on the power line 3 in a vehicle. In FIG. 8, the waveform of one impulsive noise is shown in the upper graph, the frequency characteristic is shown in the lower graph, and these are made to correspond to the characteristics of the impulsive noise for the simulations of FIG. 7.

The measured impulsive noise exhibits, as shown in the upper graph of FIG. 8, an attenuating waveform where after a waveform that steeply changes with high amplitudes, the amplitude gradually decreases and the change becomes gentle. Moreover, as shown in the lower graph of FIG. 8, the frequency of the measured impulsive noise has peaks at approximately 12 MHz and approximately 33 MHz. As described above, it is found that the characteristics of the impulsive noise for the simulations shown in FIG. 7 are close to the characteristics of the actually measured impulsive noise shown in FIG. 8.

The noise including the impulsive noise created as shown in FIG. 6 and FIG. 7 was generated on the power line 3 of the communication system having the structure shown in FIG. 2, and simulations as to how much reception error was generated were executed. The simulations were performed a plurality of times while the frequency of the carrier wave was changed to 5, 10, 15, 20, 25 and 30 MHz. The sampling frequency of the signal was 100 MHz.

Figure 9:
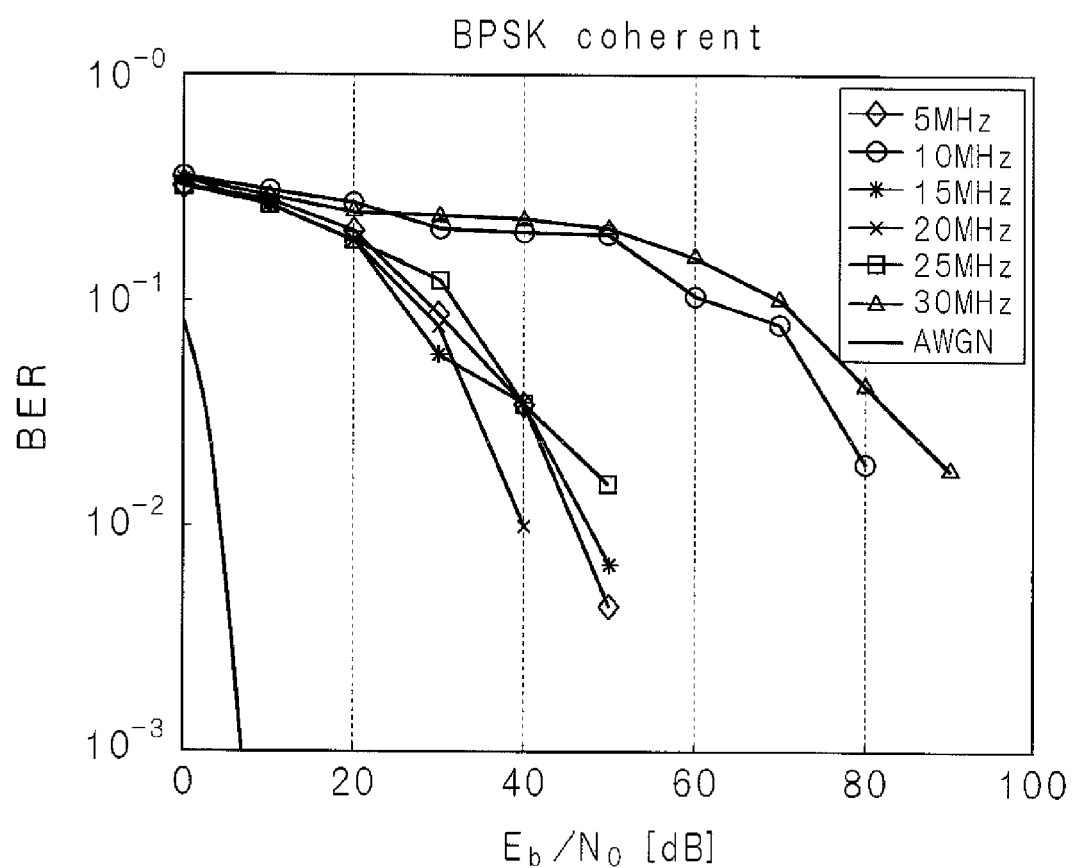
FIG. 9 is a graph showing the characteristic of the communication error obtained by a simulation.
Figure 10:
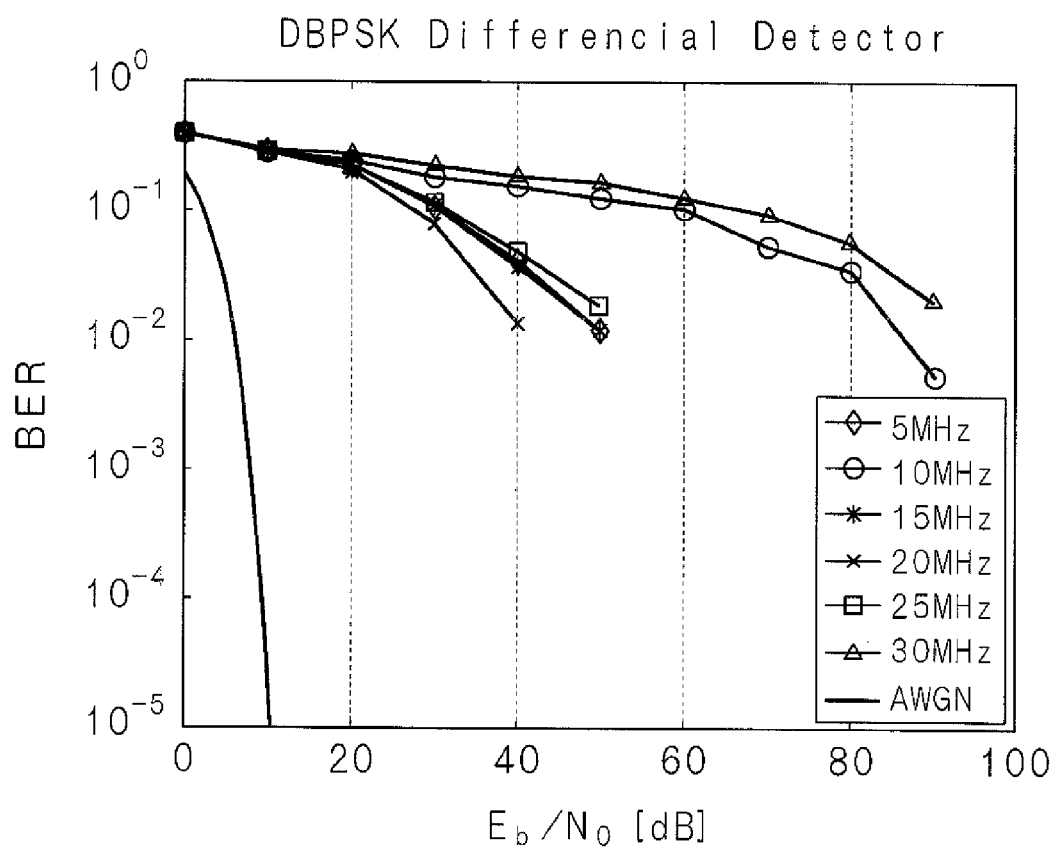
FIG. 10 is a graph showing the characteristic of the communication error obtained by a simulation.

FIG. 9 and FIG. 10 are graphs showing the characteristics of the communication error obtained by the simulations. FIG. 9 shows the results of a simulation by the BPSK method and the synchronized detection method (here, the limiter 6 is absent), and FIG. 10 shows the results of a simulation by the DBPSK method and the delay detection method (here, the limiter 6 is absent). The horizontal axis represents a signal power to background noise power $E_b/N_0$ [dB] per bit, and the vertical line represents the BER. As shown in FIG. 9 and FIG. 10, in either of the cases of the BPSK method and the DBPSK method, the BER when the frequency of the carrier wave represented by a symbol "×" is 20 MHz is relatively excellent. When the frequency of the carrier wave is 10 MHz and 30 MHz which are the same as the frequency of the impulsive noise, the BER is poor even in a domain where $E_b/N_0$ is high.

Moreover, as shown in FIG. 9 and FIG. 10, when the frequency of the carrier wave is 20 MHz, it is estimated that the BER can be made approximately $10^{-4}$ in either of the cases of the BPSK method and the DBPSK method by making $E_b/N_0$ approximately 60 [dB].

Figure 11:
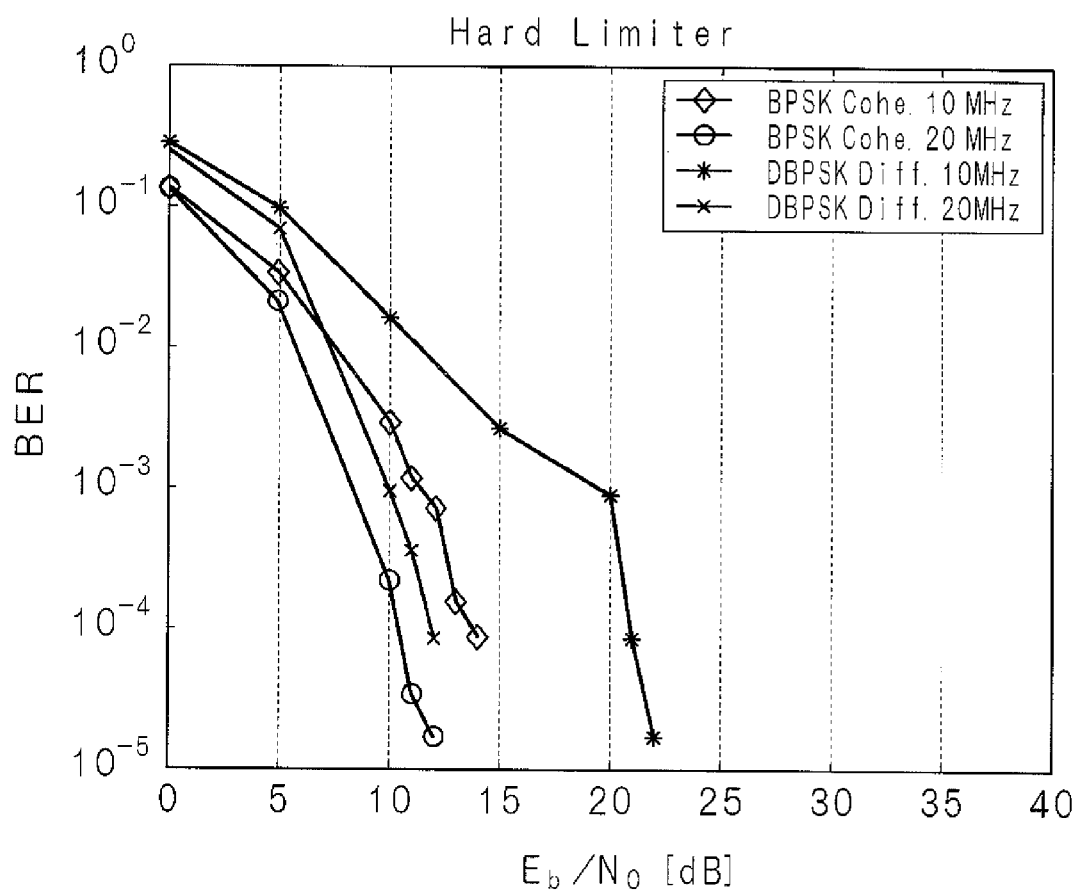
FIG. 11 is a graph showing a characteristic of the communication error obtained by simulations.

FIG. 11 is a graph showing the characteristics of the communication error obtained by the simulations, and shows both the results of simulations by the BPSK method and the synchronized detection method (the limiter 6 is present) and by the DBPSK method and the delay detection method (the limiter 6 is present). As shown in FIG. 11, in either of the cases of the BPSK method and the DBPSK method, the BER when the carrier frequency is 20 MHz is low. Although the BER is improved as compared with the case where the limiter 6 is absent also when the carrier frequency is the same as the frequency of the impulsive noise, the BER is high as compared with the case of 20 MHz.

Moreover, as shown in FIG. 11, when the frequency of the carrier wave is a frequency other than 10 MHz or the 30 MHz which is the same as the frequency of the impulsive noise, for example, 20 MHz, it is estimated that the BER can be made approximately $10^{-4}$ by making $E_b/N_0$ by the BPSK method approximately 11 [db] and making $E_b/N_0$ by the DBPSK method approximately 13 [db]. By the limiter 6, $E_b/N_0$ is improved by approximately 50 [db].

Thereby, an in-vehicle PLC system in which the influence of the impulsive noise is avoided can be realized by using the LIN protocol.

As described above, when the existing LIN is used as the communication protocol, the BER can be reduced to approximately $10^{-6}$, which is practical. Therefore, by the structure in which modulation is performed by the BPSK method, reception is performed by the synchronized detection method and the limiter 6 is used and the structure in which modulation is performed by the DBPSK method, reception is performed by the delay detection method and the limiter 6 is used, an in-vehicle harness and an in-vehicle communication system can be realized in which the influence of the impulsive noise is reduced and the communication cable for LIN is saved.

The simulation results shown in FIG. 9 to FIG. 11 described above are the impulsive noise created based on the window function of the hanning window as shown in FIG. 6 and used for the simulations. This is because the impulsive noise generated in the in-vehicle PLC was an attenuating sinusoidal wave as shown in FIG. 4. However, the inventors of the present application found that the impulsive noise generated in the in-vehicle PLC can be approximated by an exponential attenuating sinusoidal wave, and performed an re-examination by simulations with the impulsive noise as the exponential attenuating sinusoidal wave. FIG. 12 is an explanatory view conceptually showing the method of creating the noise used for the simulations.

As shown at the second from the top of FIG. 12, the interval where impulsive noise is generated (interval where "1" continues) was replaced with an envelope pulse having the same duration as the interval. As the envelope pulse, an exponential attenuating function was used.

Next, since the frequency period of the impulsive noise has peaks at 10 MHz and 30 MHz, in order that the created impulsive noise also has peaks at two frequencies of 10 MHz and 30 MHz, $P_2(t)$ is obtained which is an envelope pulse $P_1(t)$ based on the exponential attenuating function multiplied by the sum of sinusoidal waves of two frequencies $F_1$ and $F_2$ (Expression 2).

[Expression 2]

$$P_2(t) = P_1(t) \times \frac{\sin(2\pi F_1 t + \phi_1) + \sin(2\pi F_2 t + \phi_2)}{2} \quad (2)$$

Thereafter, as in the case of FIG. 6, the envelope pulse $P_2(t)$ the amplitude of which is normalized to "1" is multiplied by the amplitude A(i) of the measured impulsive noise, and the additive white Gaussian noise according to the characteristics of the receiver 12 is added as the background noise to obtain the noise used for the simulations.

FIG. 13 is graphs showing the characteristics of the impulsive noise used for the simulations which characteristics are the characteristics of the impulsive noise created by the method shown in FIG. 12. The waveform of one impulsive noise is shown in the upper graph, and the frequency characteristic is shown in the lower graph. As shown in the upper graph of FIG. 13, the amplitude of the created impulsive noise attenuates from the peak by an exponential function. As shown in the lower graph of FIG. 13, the frequency of the created impulsive noise has peaks at 10 MHz and 30 MHz similarly to the actually measured impulsive noise. The characteristics of the impulsive noise for the simulations shown in FIG. 13 are close to the characteristics of the actually measured impulsive noise shown in FIG. 8.

The noise including the impulsive noise created as shown in FIG. 12 and FIG. 13 was generated on the power line 3 of the communication system having the structure shown in FIG. 2, and simulations as to how much reception error was generated were executed. The simulations were performed for cases where the frequency of the carrier wave was 10 MHz and 20 MHz.

Figure 14:
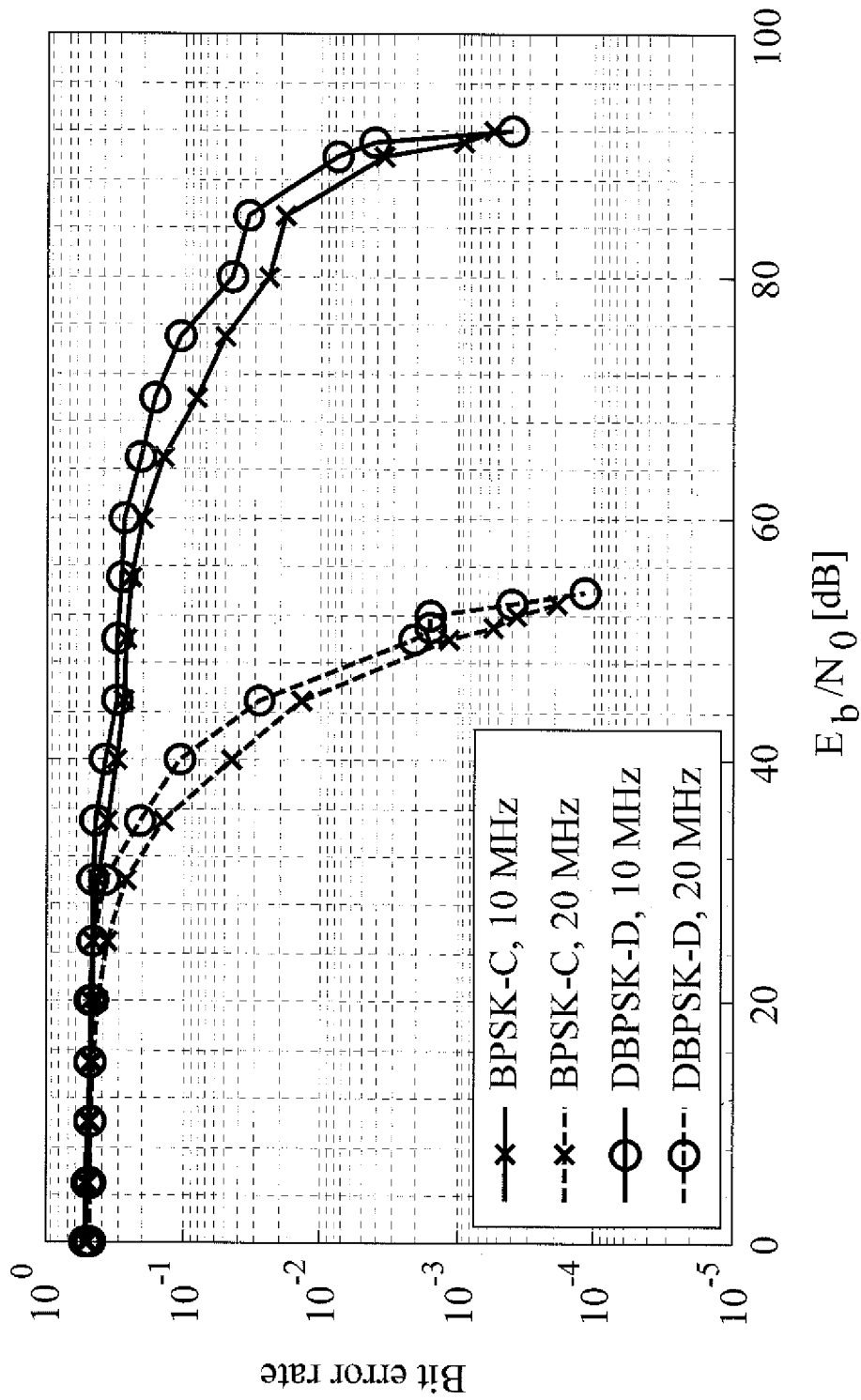
FIG. 14 is a graph showing the characteristics of the communication errors obtained by the simulations.

FIG. 14 is a graph showing the characteristics of the communication errors obtained by the simulations, and shows both the result of a simulation by the BPSK method and the synchronized detection method (here, the limiter 6 is absent) (see BPSK-C represented by a symbol "×" in the figure) and the result of a simulation by the DBPSK method and the delay detection method (here, the limiter 6 is absent) (see DBPSK-D represented by a symbol "○" in the figure). As shown in FIG. 14, in either of the cases of the BPSK method and the DBPSK method, the BER when the frequency of the carrier wave shown by the broken line is 20 MHz is excellent and the BER when the frequency of the carrier wave shown by the solid line is 10 MHz is poor.

FIG. 15 is a graph showing the characteristics of the communication errors obtained by the simulations, and shows both the result of a simulation by the BPSK method and the synchronized detection method (here, the limiter 6 is present) and the result of a simulation by the DBPSK method and the delay detection method (here, the limiter 6 is present). As the limiter 6, the hard limiter shown in FIG. 3 is used, and the amplitude is limited to the amplitude of the reception signal. As shown in FIG. 15, in either of the cases of the BPSK method and the DBPSK method, the BER when the frequency of the carrier wave shown by the broken line is 20 MHz is excellent, and the BER when the frequency of the carrier wave shown by the solid line is 10 MHz is poor.

Moreover, in the case where the limiter 6 is absent shown in FIG. 14, if the frequency of the carrier wave is made 20 MHz, by making $E_b/N_0$ approximately 55 [db], the BER can be made approximately $10^{-4}$. On the contrary, in the case where the limiter 6 is present shown in FIG. 15, if the frequency of the carrier wave is made 20 MHz, by making $E_b/N_0$ approximately 11 [db], the BER can be made approximately $10^{-4}$. That is, by using the limiter 6 (hard limiter), $E_b/N_0$ is improved by approximately 40 [db].

Figure 16:
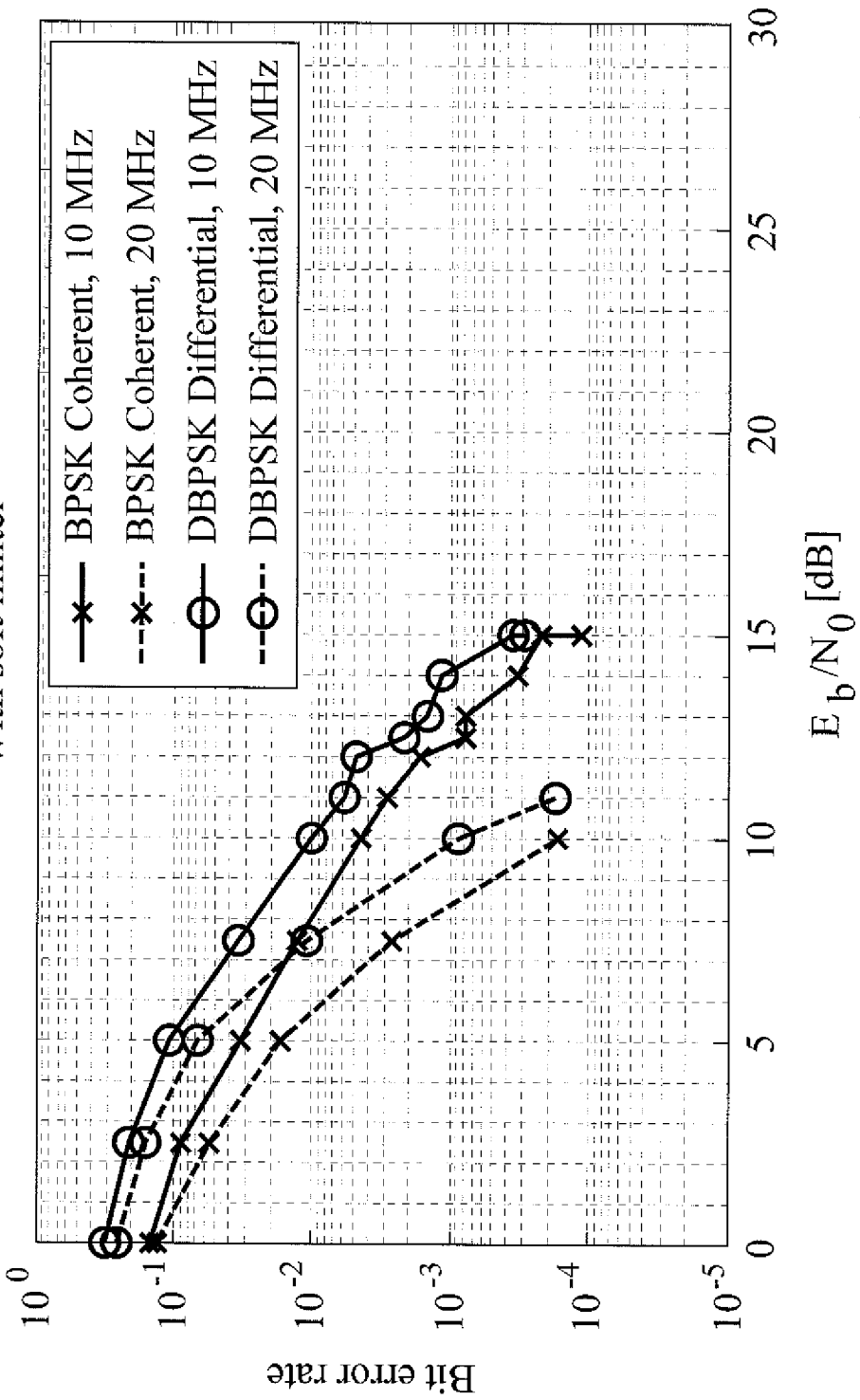
FIG. 16 is a graph showing the characteristics of the communication errors obtained by the simulations.

FIG. 16 is a graph showing the characteristics of the communication errors obtained by the simulations, and shows both the result of a simulation by the BPSK method and the synchronized detection method (here, the limiter 6 is present) and the result of a simulation by the DBPSK method and the delay detection method (here, the limiter 6 is present). As the limiter 6, the soft limiter shown in FIG. 3 is used, and the amplitude is limited to twice the amplitude of the reception signal. As shown in FIG. 16, in either of the cases of the BPSK method and the DBPSK method, the BER when the frequency of the carrier wave shown by the broken line is 20 MHz is excellent, and the BER when the frequency of the carrier wave shown by the solid line is 10 MHz is poor.

Moreover, in the case where the limiter 6 is present shown in FIG. 16, if the frequency of the carrier wave is made 20 MHz, by making $E_b/N_0$ approximately 11 [db], the BER can be made approximately $10^{-4}$. That is, by using the limiter 6 (soft limiter), $E_b/N_0$ is improved by approximately 40 [db].

As for the communication quality required of the in-vehicle PLC system by the LIN protocol, $E_b/N_0$ is 60 [db] and the BER is not more than $10^{-4}$. Therefore, when the frequency of the carrier wave is made a frequency different from the frequency of the impulsive noise (for example, 20 MHz), by using the limiter 6, $E_b/N_0$ is improved, so that the required communication quality can be sufficiently fulfilled. The amplitude limited by the limiter 6 is made not more than the amplitude of the reception signal in the case of the hard limiter and is made not more than twice the amplitude of the reception signal in the case of the soft limiter, whereby the required communication quality can be sufficiently fulfilled.

Moreover, since $E_b/N_0$ is improved by employing the above-described structure, the output power of the communication signal outputted by the transmitter 11 can be reduced. Thereby, the power consumption of the transmitter 11 can be reduced, and the noise emitted in connection with communication can be reduced.

Figure 17:
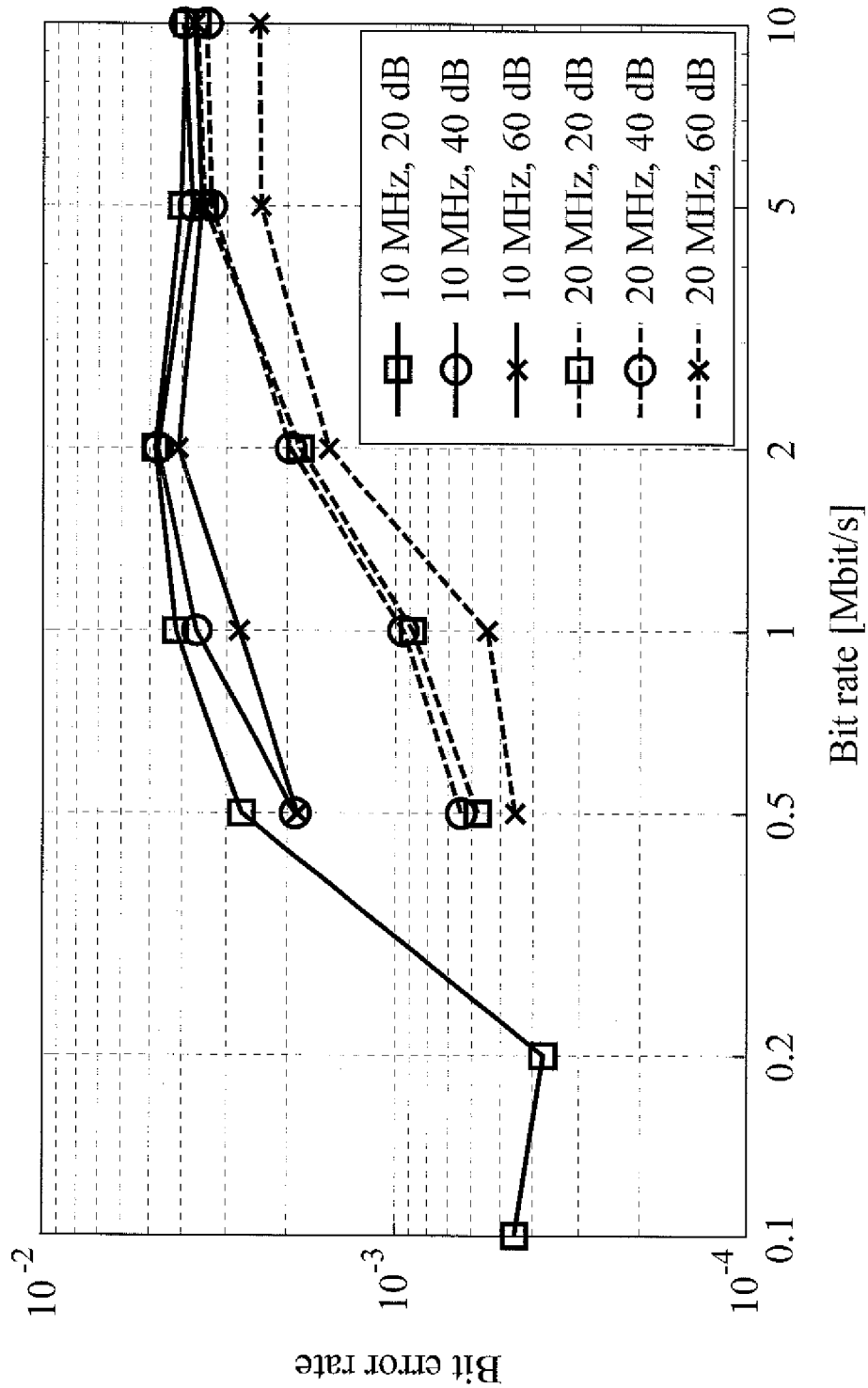
FIG. 17 is a graph showing the characteristics of the communication error obtained by a simulation.

FIG. 17 is a graph showing the characteristics of the communication error obtained by a simulation. The horizontal axis represents the communication rate (bit rate) [Mbit/s], and the vertical axis represents the BER. This simulation result is obtained with a structure in which communication is performed by the DBPSK method and the delay detection method and the limiter 6 (hard limiter) is used. Moreover, the simulation was performed with the frequency of the carrier wave being 10 MHz or 20 MHz and $E_b/N_0$ of the signal being 20 dB, 40 dB or 60 dB. Moreover, in this simulation, although an error occurred at bit rates of 100 kbit/s and 200 kbit/s when the carrier frequency was 10 MHz and $E_b/N_0$ was 10 dB, no error occurred at bit rates of 100 kbit/s and 200 kbit/s in other cases; therefore, in the graph of FIG. 17, the simulation result is not plotted.

As shown in FIG. 17, when the frequency of the carrier wave is made 20 MHz different from the frequency of the impulsive noise, by making the bit rate not more than 200 kbit/s, error occurrence can be reduced (error occurrence can be eliminated). Since the communication quality required of the in-vehicle PLC system by the LIN protocol is such that $E_b/N_0$ is 60 [db] and the BER is not more than $10^{-4}$, in this structure, this communication quality can be sufficiently fulfilled. Moreover, the communication rate of the LIN protocol is 20 kbit/s, and in this structure, communication rate increase of up to approximately ten times this communication rate can be realized.

In the above-described embodiment, a structure has been described in which the PLC system is applied to a vehicle LAN. However, the present invention is not limited thereto, and may be applied to a communication system for controlling a load that can cause impulsive noise.

Second Embodiment

Figure 18:
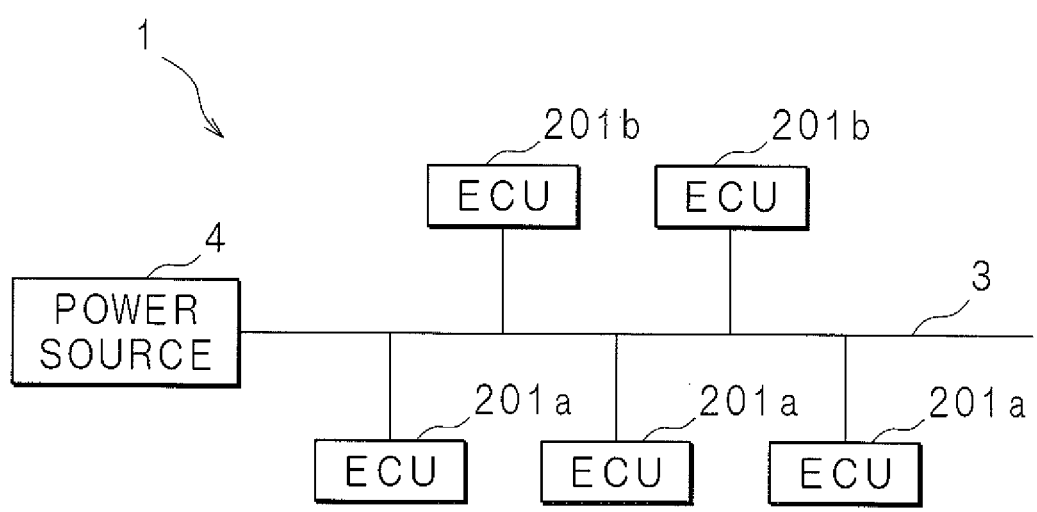
FIG. 18 is a block diagram showing the structure of an in-vehicle PLC system of a second embodiment.

FIG. 18 is a block diagram showing the structure of an in-vehicle PLC system of a second embodiment. The in-vehicle PLC system of the second embodiment is classified into two groups with respect to communication, and a first ECU 201*a* belonging to a first communication group and a second ECU 201*b* belonging to a second communication group are connected to a common power line 3 and each performs communication through this power line 3.

While the first ECU 201*a* has the transmitter 11 and the receiver 12 shown in FIG. 2 and has substantially the same structure as the ECU 1 of the first embodiment, the frequency of the carrier wave used for the modulation and demodulation of the data signal is different. The frequency of the carrier wave (first carrier wave) used by the first ECU 201*a* according to the second embodiment is set to a frequency substantially the same as the (peak) frequency of the impulsive noise generated on the power line 3, for example, 10 MHz. Moreover, the symbol duration of the signal transmitted and received by the first ECU 201*a* through the power line 3 is sufficiently longer than the impulsive noise as shown in FIG. 4 (for example, 50 µs).

Comparing the simulation results shown in FIG. 14 and FIG. 15, even though the frequency of the carrier wave is 10 MHz which is the same as the frequency of the impulsive noise, a sufficient BER improvement effect is obtained by providing the first ECU 201*a* with the limiter 6.

While the second ECU 201*b* also has the transmitter 11 and the receiver 12 shown in FIG. 2 (however, it may have a structure not having the limiter 6) and has substantially the same structure as the first ECU 201*a*, it performs higher-speed communication than the first ECU 201*a*. That is, the symbol duration of the signal transmitted and received by the second ECU 201*b* is shorter than that of the first ECU 201*a* (for example, 100 ns). Moreover, the frequency of the carrier wave (second carrier wave) used by the second ECU 201*b* is set to a frequency different from the frequency of the impulsive noise generated on the power line 3, for example, 20 MHz.

That is, in the in-vehicle PLC system according to the second embodiment, the first ECU 201*a* performing low-speed power line communication uses the first carrier frequency close to the frequency of the impulsive noise, and the second ECU 201*b* performing high-speed power line communication uses the second carrier frequency far from the frequency of the impulsive noise. Since the first ECU 201*a* has a long symbol duration and the influence on the impulsive noise is small because of the provision of the limiter 6, the carrier frequency of the first ECU 201*a* can be made close to the frequency of the impulsive noise, whereby the range of frequencies that the second ECU 201*b* can use as the carrier frequency can be broadened. By making the carrier frequency of the second ECU 201*b* sufficiently far from the frequency of the impulsive noise, the influence of the impulsive noise on the power line communication by the second ECU 201*b* can be suppressed.

While in the above-described second embodiment, the symbol duration of the first ECU 201*a* is 50 µs, the first carrier frequency is 10 MHz, the symbol duration of the second ECU 201*b* is 100 ns and the second carrier frequency is 20 MHz, these numerical values are an example and the present invention is not limited thereto. Moreover, while the two communication groups perform communication through the common power line 3, the present invention is not limited thereto, three or more communication groups may perform communication through the common power line 3, and in this case, the carrier frequency used by the communication group performing the lowest-speed communication is made the closest to the frequency of the impulsive noise.

The disclosed embodiments should be considered as illustrative and not restrictive in all respects. The scope of the present invention is defined by the claims rather than by the description given above, and it is intended that all changes that fall within the meaning and scope equivalent to the claims are embraced.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power line communication system, comprising:
   a power line routed in a vehicle;
   a plurality of communication devices mounted on the vehicle which perform communication through the power line; and
   an amplitude limiter which limits amplitude of a signal propagating on the power line, to within a predetermined amplitude value,
   wherein the communication devices include:
      a plurality of first communication devices which modulate a data signal having a first carrier frequency by phase shift modulation and perform low-speed communication through the power line; and
      a plurality of second communication devices which modulate, by the phase shift modulation, a data signal having a second carrier frequency different from the first carrier frequency and perform high-speed communication through the power line,
      the first carrier frequency is closer to a frequency of an impulsive noise generated on the power line than the second carrier frequency, and
      a symbol duration of the signal modulated by the first communication devices is longer than a duration of the impulsive noise.

2. The power line communication system according to claim 1,
   wherein the phase shift modulation is BPSK (Binary Phase Shift Keying), and the communication devices receive the data signal by a synchronized detection method.

3. The power line communication system according to claim 1,
   wherein the phase shift modulation is DBPSK (Differential Binary Phase Shift Keying), and
   the communication devices receive the data signal by a delay detection method.

4. The power line communication system according to claim 1,
   wherein the predetermined amplitude value is predetermined based on a characteristic of the impulsive noise generated on the power line.

5. The power line communication system according to claim 1,
   wherein the predetermined amplitude value is not more than twice the amplitude value of the signal transmitted and received between the communication devices.

* * * * *